United States Patent
Negri et al.

(10) Patent No.: US 11,719,329 B2
(45) Date of Patent: Aug. 8, 2023

(54) PLANETARY REDUCING GEARSET COMPRISING A PRESTRESSED FLEXIBLE SUPPORT

(71) Applicant: SAFRAN AIRCRAFT ENGINES, Paris (FR)

(72) Inventors: Arnaud Nicolas Negri, Moissy-Cramayel (FR); Julien Fabien Patrick Becoulet, Moissy-Cramayel (FR); Romain Guillaume Cuvillier, Moissy-Cramayel (FR); Emmanuel Pierre Dimitri Patsouris, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/430,172

(22) PCT Filed: Feb. 5, 2020

(86) PCT No.: PCT/HR2020/050193
§ 371 (c)(1),
(2) Date: Aug. 11, 2021

(87) PCT Pub. No.: WO2020/165523
PCT Pub. Date: Aug. 20, 2020

(65) Prior Publication Data
US 2022/0154815 A1    May 19, 2022

(30) Foreign Application Priority Data

Feb. 14, 2019  (FR) .................................... 19 01496

(51) Int. Cl.
  *F16H 57/08*  (2006.01)
  *F16H 1/28*  (2006.01)
  *F01D 15/12*  (2006.01)

(52) U.S. Cl.
  CPC .......... *F16H 57/082* (2013.01); *F01D 15/12* (2013.01); *F16H 1/28* (2013.01)

(58) Field of Classification Search
  CPC ......... F16H 57/082; F16H 15/12; F01D 15/12
  See application file for complete search history.

(56) References Cited

U.S. PATENT DOCUMENTS 10,316,891 B2 * 6/2019 Venter ................ F16H 57/0424

FOREIGN PATENT DOCUMENTS

EP       3686458 A1 *  7/2020  .......... F16H 1/2863
JP    2004-116737 A    4/2004
(Continued)

OTHER PUBLICATIONS

JP-4962223-B2, Hata, Jun. 2012—Machine translation.*
(Continued)

*Primary Examiner* — Tinh Dang
(74) *Attorney, Agent, or Firm* — Oblon, McClelland, Maier & Neustadt, L.L.P.

(57) ABSTRACT

A reducing assembly includes a planet carrier that is flexible and fixed, borne by a casing which surrounds it by two distinct connections with this casing, with a device for applying a torsional prestress to the planet carrier between these two connections. Prestressing the flexible planet carrier makes it possible to limit its level of mechanical stress when it is in service, in order to simplify its design and dimensioning.

10 Claims, 5 Drawing Sheets

(56) References Cited

FOREIGN PATENT DOCUMENTS

JP          2009-58002 A     3/2009
JP           4962223 B2 *  6/2012

OTHER PUBLICATIONS

International Search Report dated May 12, 2020 in PCT/FR2020/050193 filed on Feb. 5, 2020, 2 pages.
French Preliminary Search Report dated Oct. 25, 2019 in French Patent Application No. 19 01496 filed on Feb. 14, 2019 (with translation of category of cited documents), 2 pages.

* cited by examiner

PLANETARY REDUCING GEARSET COMPRISING A PRESTRESSED FLEXIBLE SUPPORT

TECHNICAL FIELD

The invention relates to a planetary reducing gearset with a flexible planet carrier for use particularly in a turbomachine such as a turbojet.

STATE OF PRIOR ART

In such an engine 1 shown in FIG. 1, air is drawn in through an intake duct 2 to pass through a fan 3 comprising a series of rotating airfoils before being split into a central core flow and a bypass flow surrounding the core flow.

The core flow is then compressed in compression stages 4 and 6 before entering a combustion chamber 7, after which it is expanded through a high-pressure turbine 8 and a low-pressure turbine 9 before being evacuated in the aft direction. The bypass flow is propelled directly in the aft direction by the fan in a flow stream delimited by the case 11.

Such an engine is usually of the twin spool type: it comprises a so-called low-pressure rotor through which the fan 3 is coupled to the low-pressure turbine, surrounded by a so-called high-pressure rotor through which the compressor is coupled to the high-pressure turbine, these two rotors being independent of each other in rotation.

In some architectures, a reducing gearset is interposed between the low-pressure rotor and the fan, so that the blower rotates more slowly than the low-pressure turbine that drives it, thereby increasing the efficiency.

The reducing gearset that is of the planetary type, is located in the vicinity of the fan as shown schematically in FIG. 2 in which it is marked with the reference 12. It comprises a sun gear 13 fixed to the low-pressure rotor, surrounded by planet gears 14 themselves surrounded by a ring gear 16 in the form of a ring with internal teeth fixed to the fan 3. Each planet gear 14 is engaged with the sun gear 13 and with the ring gear 16.

The planet gears 14 are carried by a planet carrier 17 that is attached to a fixed structural component 18 of the engine. This planet carrier 17 has an annular body 19 carrying the planet gears 14, and a support 21 of revolution through which this body 19 is fixed to the structure 18.

During operation, the sun gear 13 carried by the low-pressure rotor drives the planet gears 14 that rotate around fixed pins carried by the planet carrier 17, that drive the fan 3 in rotation through the ring gear 16 with which they are engaged. This causes the fan 3 to rotate in the opposite direction to the low-pressure rotor and at a lower speed.

For reasons of overall dynamics, the support 21 is flexible along the radial direction to compensate for a lack of coaxiality of the fan and the low-pressure rotor, in practice this flexibility corresponds to a flexibility of the support 21 around the radial directions relative to the AX axis. As can be seen in FIG. 21, the support 21 has a general bellows shape of revolution, in which the corrugations are crenelated when viewed in section.

The body 19 is provided with external teeth engaged in internal teeth of a ring gear 22 surrounding this body 19 and that is rigidly attached to the structure 18. The engagement of these teeth that constitute a dog or spline type of coupling is provided with a significant circumferential clearance.

Under normal operating conditions, the torque applied on the body 19 results in a small torsion of the support 21 around the AX axis, so that the external teeth of the body 19 do not bear circumferentially on the teeth of the ring gear 22, due to the significant circumferential clearance of these teeth. The torque applied on the body 19 is then entirely transferred to the structure 18 through the support 21.

When the torque applied on the body 19 increases and exceeds normal conditions, the torsional deformation of the support 21 about the AX axis increases until the teeth on the body 19 bear circumferentially on the teeth of the ring gear 22. Under these conditions, part of the torque is transmitted through the flexible support 21 and the remaining part of the torque is transmitted through the teeth, which avoids applying excessive stress on this flexible support.

In general, the fact that a high torque is applied to the satellite carrier although the satellite carrier has to have significant radial flexibility makes its sizing problematic.

The purpose of the invention is to provide a solution that simplifies the design of such a reducing gearset.

PRESENTATION OF THE INVENTION

To achieve this, the subject of the invention is a reducing gearset comprising a mobile sun gear and a mobile ring gear and a flexible and fixed planet carrier carrying planet gears that are engaged with the sun gear that they surround and with the ring gear that surrounds them, this planet carrier being connected to a case that surrounds it by at least two separate connections, with means to pretension the planet carrier between these two connections in torsion.

Thus, the invention can reduce the maximum torsional stress in the planet carrier during operation, a torsion being applied to the planet carrier when it is in service in the direction opposite to its prestress.

The invention also relates to a reducing gearset thus defined, wherein one of the two connections between the planet carrier and the case is a dog-type connection, comprising external teeth carried by the planet carrier and internal teeth carried by the case, and in which the prestress means are carried by teeth.

The invention also relates to a reduction gearset thus defined, wherein the prestress means are coil springs, each spring being circumferentially oriented and carried by a tooth, and interposed between an external tooth and an internal tooth that is consecutive to it.

The invention also relates to a reducing gearset thus defined, wherein each spring is carried by a tooth provided with a bearing face through which it bears on the tooth that is consecutive to it if the spring is fully compressed.

The invention also relates to a reducing gearset thus defined, wherein each spring surrounds a pin projecting from a tooth, this pin terminating at a bearing face.

The invention also relates to a reducing gearset thus defined, wherein each spring is engaged in a hole formed in the tooth that carries it.

The invention also relates to a reducing gearset thus defined, wherein the other connection between the planet carrier and the case is also a dog-type connection.

The invention also relates to a reducing gearset thus defined, comprising teeth provided with several springs.

The invention also relates to a reducing gearset thus defined, comprising at least one tooth provided with two springs separated radially or longitudinally on one face of this tooth.

Turbomachine comprising a reducing gearset thus defined.

Turbojet comprising a reducing gearset thus defined.

DETAILED DESCRIPTION

Figure 3:
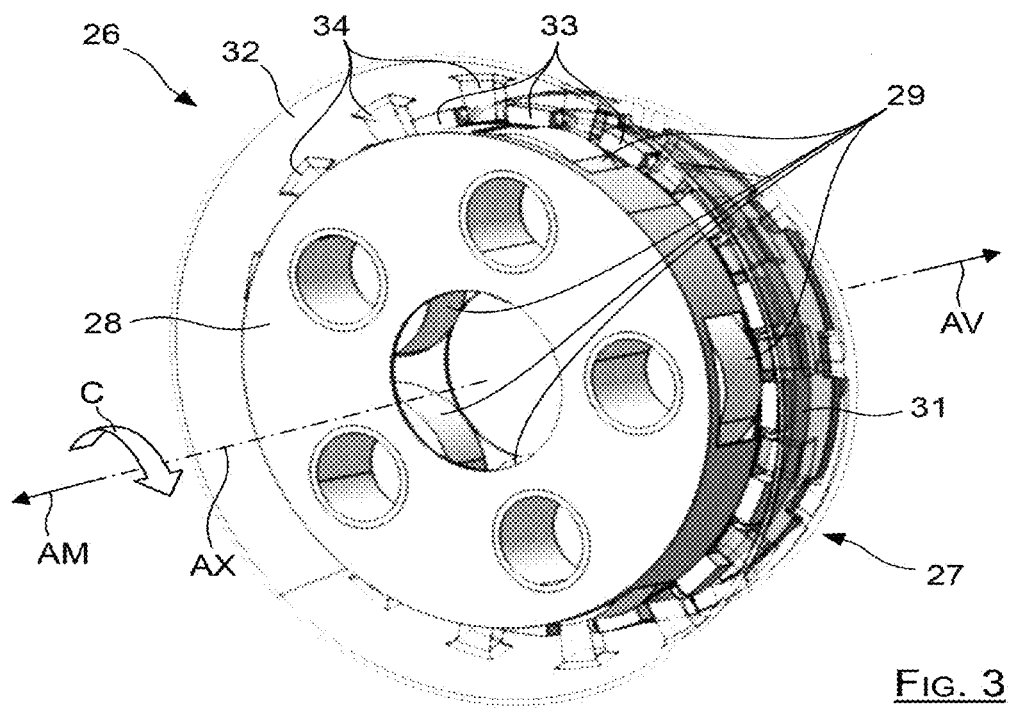
FIG. 3 is an overall perspective view of the gearset according to the invention.

The reducing gearset according to the invention, marked with reference 26 in FIG. 3, comprises a planet carrier 27 comprising firstly an annular body 28 carrying five planet gears 29, and secondly a support 31 of revolution through which this body 28 is attached to a fixed component of the engine case 32 forming part of the turbomachine structure. The support 31 projects from a downstream face of the body, the upstream AM and downstream AV faces being defined relative to the direction of air flow in the engine, the planet carrier 27 possibly being built by assembling the body 28 with the support 31 through a flange.

This planet carrier 27 that is fixed in rotation around the longitudinal axis AX of the engine, surrounds a sun gear not shown and is part of a low pressure rotor that is not visible, and is surrounded by a ring gear not shown fixed to a fan of the engine. Each planet gear 29 is engaged with the sun gear and the ring gear not shown, the interior and the exterior being defined relative to the longitudinal axis AX, with the sun gear having a diameter less than the ring gear and consequently being closer to the AX axis.

Figure 1:
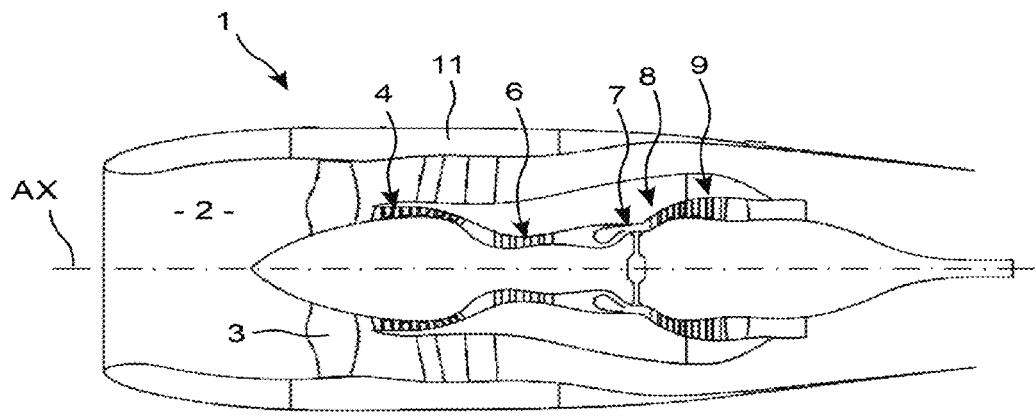
FIG. 1 is a longitudinal sectional view through a known turbojet.
Figure 2:
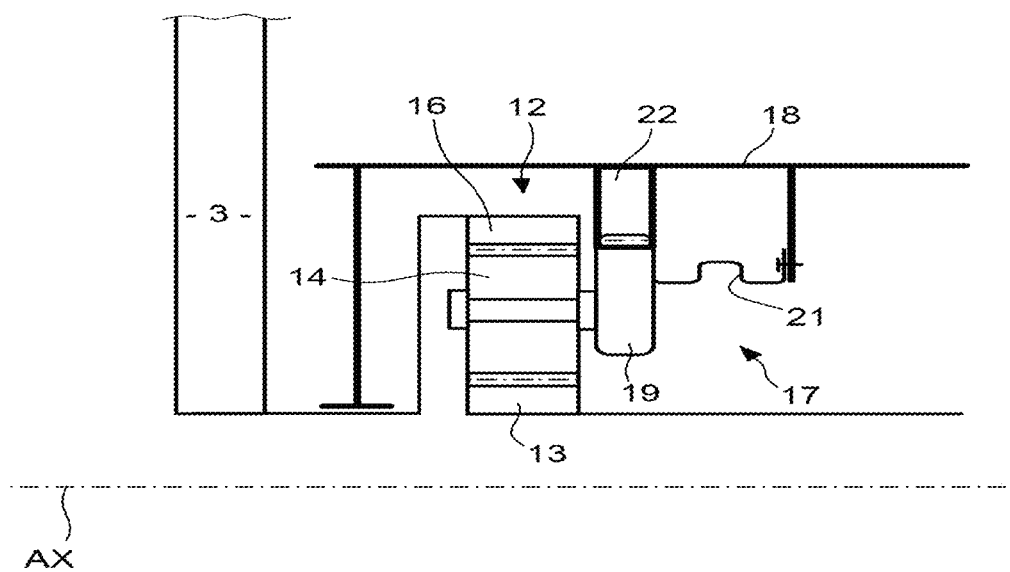
FIG. 2 is a diagrammatic longitudinal half-sectional view of a known epicyclic reducing gearset.

As in the case in FIG. 2, the low-pressure rotor thus rotates the fan through the planet gears 29 that rotate around fixed axes, the fan thus rotating more slowly than the low-pressure rotor and in the opposite direction.

The support 31 is sized to have a certain flexibility in order to compensate for the lack of coaxiality between the body 28 and the sun and ring gears. Therefore it also has some flexibility in torsion around the AX axis. As seen in FIGS. 3 to 6, this carrier 31 is in the general shape of a bellows, with rectangular type corrugations when viewed in section.

The planet carrier assembly is locked in rotation by means of a dog type upstream connection L1 located at the body 28, and a downstream connection L2, also of the dog type located downstream from the support 31. These two dog connections are sized with a significant circumferential clearance so that they can cooperate in distributing transmission of the torque applied by the planet carrier on the case 32 that surrounds it.

The body 28 is provided with upstream external teeth 33 that are engaged between upstream internal teeth 34 of the case 32, the engagement of the upstream teeth 33 with the upstream teeth 34 constitutes a dog-type connection, but a significant clearance is provided in the circumferential and radial directions when stopped and during normal operation.

Figure 4:
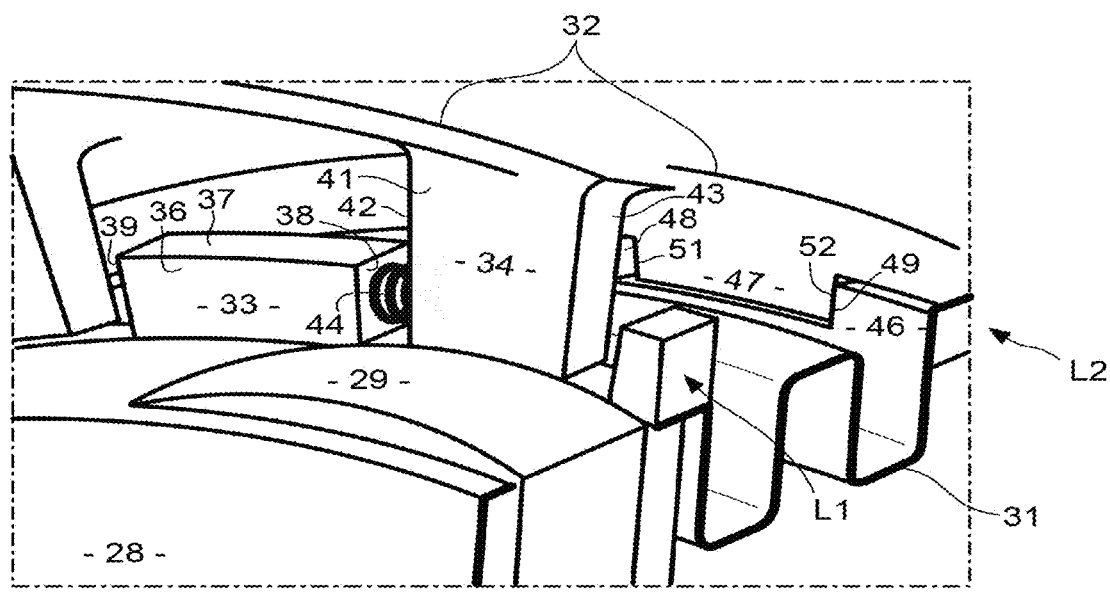
FIG. 4 is a perspective view of the reducing gearset according to the invention when it is not in service.

As can be seen in more detail in the example in FIG. 4, each upstream external tooth 33 has a relatively simple general shape similar to a parallelogram, delimited by an upstream face 36, a downstream face, a radially external face 37, a lateral bearing face 38 and a secondary lateral face 39. The upstream and downstream faces are normal to the AX axis, while the bearing face and the secondary face extend along planes passing through or at a small distance from the AX axis.

Similarly, in the example in the figures, each upstream internal tooth 34 is also parallelepiped in shape bounded by an upstream face 41, a downstream face, a radially internal face, a lateral bearing face 42 and a secondary lateral face 43.

Each upstream external tooth 33 carries a helical spring 44 that projects from its bearing face 38 being oriented towards and bearing on the bearing face 42 of the internal upstream tooth 34 that is interposed between these two consecutive upstream external teeth (33).

The downstream end of the support 31 is provided with downstream external teeth 46 that are engaged between downstream internal teeth 47 of the case 32, forming the downstream dog connection T2 that also has a significant circumferential clearance.

In the example in the figures, the shape of each downstream external tooth 46 is similar to a parallelogram, delimited by an upstream face, a downstream face, a radially external face, a lateral bearing face 48 and a secondary lateral face 49, having the same orientations as the faces of the upstream external teeth. In the example in the figures, each downstream internal tooth 47 is also in the form of a parallelepiped delimited by an upstream face, a downstream face, a radially internal face, a lateral bearing face 51 and a secondary lateral face 52 having the same orientations as the faces of the upstream internal teeth.

The springs 44 press the lateral bearing faces 38 and 42 of the upstream external and internal teeth away from each other, tending to turn the planet carrier 27 relative to the case 32 in the anticlockwise direction in the figures, the ring gear that is connected in rotation to the engine fan rotating in the clockwise direction. Thus, in the rest state as in FIG. 4, the springs 44 tend to rotate the planet carrier until the downstream internal and external teeth bear against each other at their secondary lateral faces 49 and 52.

In this situation, the body 28 and the downstream end of the support 31 are considered as being at their respective reference positions around the AX axis. This reference position corresponds to a prestressed state of the support 31, i.e. in which this support is deformed in torsion in the anticlockwise direction between connections L1 and L2, this anticlockwise direction being opposite to its direction of deformation when it is in service.

When the assembly is assembled together, the springs 44 are compressed and a pretorsion is applied to the support 31, this operation advantageously being carried out with special tools removed after assembly. The clearance at the downstream teeth is advantageously minimal, to facilitate assembly and limit the amplitude of the movement of the planet carrier.

Figure 5:
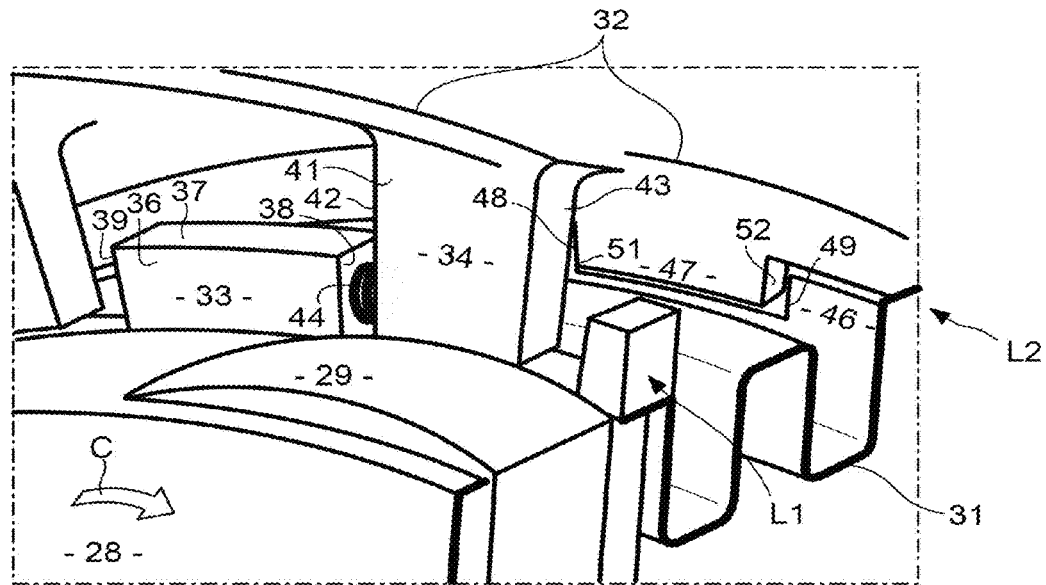
FIG. 5 is a perspective view of the reducing gearset according to the invention when it is in service under nominal conditions.

When the engine is under normal operating conditions as shown in FIG. 5, the body 28 is subjected to a nominal torque C resulting from forces applied on the teeth of the planet gears 29, that tends to rotate it in the clockwise direction opposing the springs 44. Under these conditions, the springs 44 are compressed until the downstream internal and external teeth 46 and 47 come into contact with each other through their bearing faces 48 and 51 respectively, and the springs 44 are compressed between the bearing faces 38 and 42 that they tend to force apart.

The assembly is sized so that, in this situation, the flexible support 31 undergoes a significant elastic torsional deformation about the AX axis between connections L1 and L2, with its body 28 rotating by a small value in the clockwise direction relative to its downstream portion. Thus, part of the torque C is transmitted to the case 32 by the upstream teeth through the springs 44, the complementary part of this torque being transmitted to the case by the downstream teeth bearing on each other.

In other words, when the torque C is equal to a nominal value, the compression of the springs 44 is too low to resist the entire torque: they are compressed until they bring the downstream internal and external teeth into contact.

Advantageously, this contact is made in the transient engine speed phase, so that at stable engine speed, there is no alternating contact and separation of the downstream teeth that could generate vibrations due to periodic torque variations.

The springs 44 are advantageously sized to transfer about half of torque C during normal operation, this size being dependent on the number and the stiffness of the springs.

Figure 6:
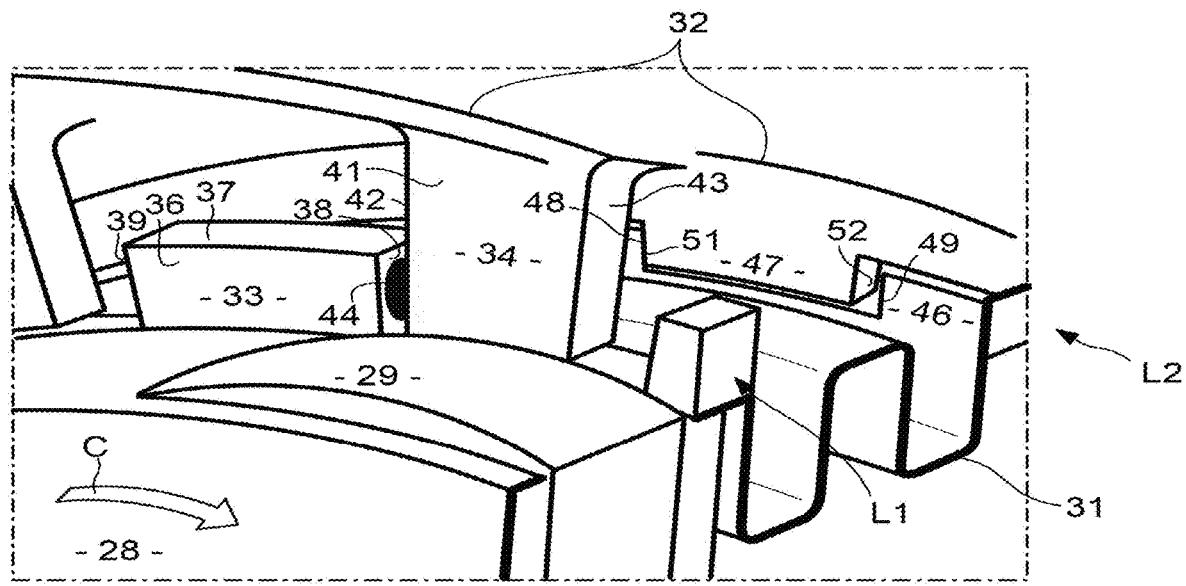
FIG. 6 is a perspective view of the reducing gearset according to the invention when it is in service beyond nominal conditions.

When the torque C becomes greater than a predetermined nominal value, as in FIG. 6, the springs 44 are fully compressed, and the support 31 undergoes maximum torsional deformation about the AX axis in the clockwise direction between its connections L1 and L2. In the extreme situation shown in FIG. 6, the springs 44 undergo maximum compression: each external tooth 33 comprises a pin 53 projecting perpendicular to its bearing face 38 surrounded by the spring 44, and the end of which is a contact pad 54 bearing directly on the lateral face 42 of the next internal tooth 34. This arrangement is shown in more detail in FIG. 7, in which the axis is marked as reference 53 and its contact pad is marked as reference 54.

In this situation, the support 31 undergoes an elastic deformation in torsion about the AX axis between connections L1 and L2 that is maximum for the size. The additional torque relative to the nominal torque is then transmitted to the case 32 by the upstream internal and external teeth, that then bear directly on each other.

Figure 7:
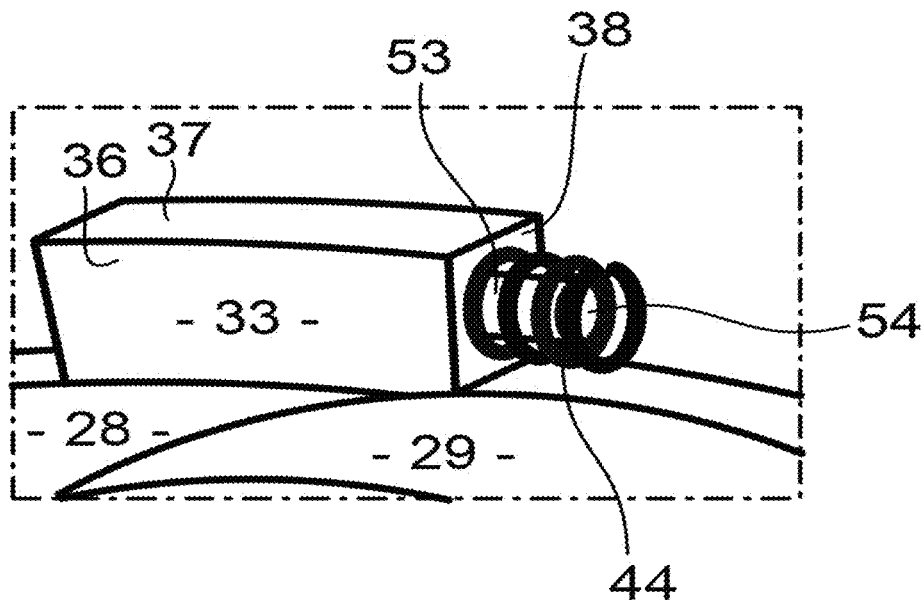
FIG. 7 is a perspective view of a tooth fitted with a pin terminated by a contact pad in the reducing gear according to the invention.
Figure 8:
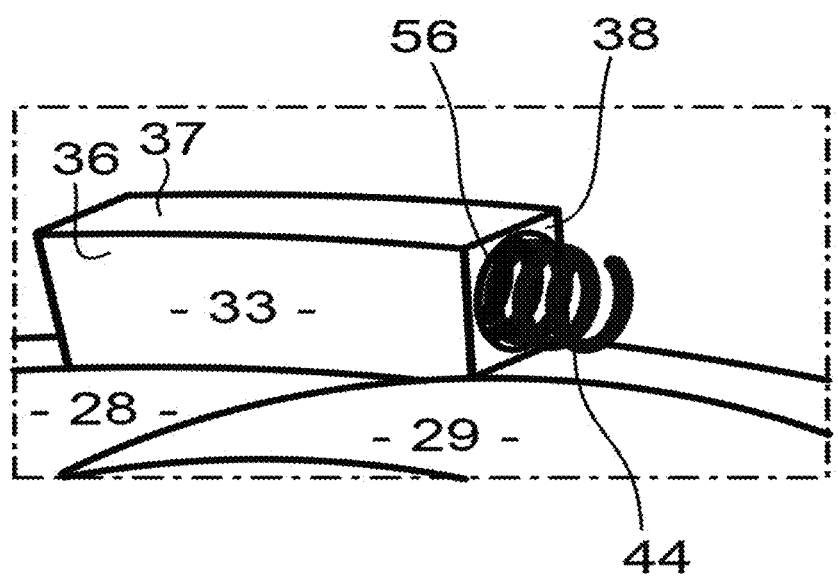
FIG. 8 is a perspective view of a variant of a tooth for which the bearing face forms a contact pad in the reducing gearset according to the invention.

In the example in FIG. 7, the spring 44 surrounds a pin 53 projecting from the bearing face 38, the end of which forms the bearing pad 54 of the external tooth 33 on the bearing face 42 of the next internal tooth 34. Other arrangements are possible, as in the example in FIG. 8, in which there is a blind hole 56 in the tooth 33 that passes through its bearing face 38 and in which the spring 44 is housed that projects significantly from this hole in the rest state. When the transmitted torque is greater than the nominal value, the tooth 33 then bears directly through its bearing face 38 on the bearing face 42 of the next internal tooth 34, the spring 44 then being fully compressed in the blind hole 56.

In the case in FIG. 7, there is a clearance between the pin 53 and the spring 44 surrounding it, so that the spring can tolerate axial and radial movements of the body 28 relative to the case 32 fixed to the structure. In other words, the inside diameter of the spring 44 is larger than the outside diameter of the pin 53. Similarly, in the case in FIG. 8, a clearance is provided between the hole 56 and the spring 44 that fits in this hole: the inside diameter of the hole 56 is larger than the outside diameter of the spring 44.

Figure 9:
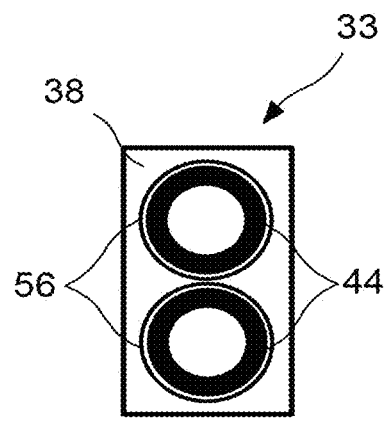
FIG. 9 is a diagrammatic representation showing a first variant arrangement of springs in a reducing gearset according to the invention.
Figure 10:
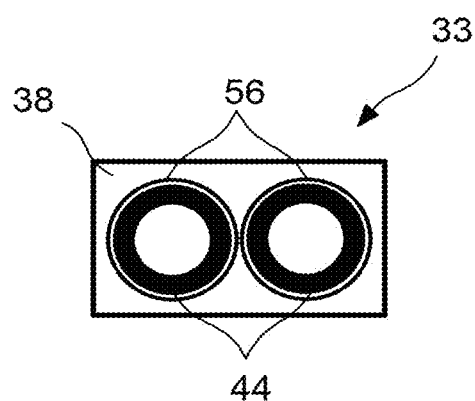
FIG. 10 is a diagrammatic representation showing a second variant arrangement of springs in a reducing gearset according to the invention.

In both cases, the spring 44 is a coil spring that is fitted on the tooth that carries it, but it is also possible that each tooth can have two or three springs, in any appropriate arrangement, depending on the shape and extent of the bearing face 38. For this purpose, FIG. 9 shows an arrangement wherein a tooth carries two springs 44 on its bearing face 38 that are radially separated from each other relative to the AX axis. In another configuration corresponding to FIG. 10, the tooth carries two springs 44 arranged longitudinally side-by-side on its bearing face 38, i.e. separated from each other along the AX axis.

In general, the first connection L1 transfers torque beyond the nominal working torque, such torque also being called the ultimate torque. This first connection L1 forms a limiter of the torsional deformation of the flexible support 31, and consequently a limiter of the mechanical torsional stress applied to this support 31.

In the examples in the figures, the springs 44 provide the torsional prestress of the planet carrier 27, but other means may also be considered, for example such as a passive or active hydraulic or pneumatic system or a magnetic type system.

The invention claimed is:
1. A reducing gearset comprising:
a sun gear and a ring gear both mobile in rotation relatively to a longitudinal axis; and
a flexible planet carrier that is fixed in rotation relatively to the longitudinal axis, the planet carrier carrying planet gears that are engaged with the sun gear that the planet gears surround and with the ring gear that surrounds the planet gears, the planet carrier being connected to a case that surrounds the planet carrier by at least first and second separate connections that are spaced along the longitudinal axis, with prestress means to pretension the planet carrier between the first and second connections in torsion,
wherein the first connection, which is between the planet carrier and the case, is a dog-type connection, comprising external teeth carried by the planet carrier and internal teeth carried by the case, and in which the prestress means are carried by the at least one of the external teeth and internal teeth.

2. The reducing gearset according to claim 1, wherein the prestress means are coil springs, each coil spring being circumferentially oriented and carried by an external tooth, and interposed between the external tooth and an internal tooth that is consecutive to the external tooth.

3. The reducing gearset according to claim 2, wherein the external tooth is provided with a bearing face through which the external tooth bears on the internal tooth if the coil springs are fully compressed.

4. The reducing gearset according to claim 2, wherein at least one coil spring of the coil springs surrounds a pin projecting from a tooth, the pin terminating at a bearing face.

5. The reducing gearset according to claim 2, wherein at least one coil spring of the coil springs is engaged in a hole formed in the tooth that carries the spring.

6. The reducing gearset according to claim 1, wherein the other connection between the planet carrier and the case is also a dog-type connection.

7. The reducing gearset according to claim 2, comprising teeth provided with several coil springs of the coil springs.

8. The reducing gearset according to claim 7, comprising at least one tooth provided with two coil springs of the coil springs separated radially or longitudinally on one face of the tooth.

9. A turbomachine comprising the reducing gearset according to claim 1.

10. A turbojet comprising the reducing gearset according to claim 1.

* * * * *